United States Patent Office 3,676,175
Patented July 11, 1972

3,676,175
PAPER COATED WITH PIGMENTED RESIN AND OPTICAL BRIGHTENING AGENT
Anthony Ian Woodward, Amersham, and Angus John Challis Purdie, Maidenhead, England, assignors to Wiggins Teape Research & Development Limited, London, England
No Drawing. Filed June 17, 1970, Ser. No. 46,884
Claims priority, application Great Britain, June 23, 1969, 31,654/69
Int. Cl. G03c 1/86, 1/92
U.S. Cl. 117—33.5 T
4 Claims

ABSTRACT OF THE DISCLOSURE

A synthetic resin composition which contains antimony trioxide and an optical brightening agent for the production of photograph support materials. The composition is used in sheet form or coated on to a base of paper or board. The synthetic resin composition surface can be sensitized with a photograph emulsion or coated with silver precipitation nuclei.

---

This invention relates to pigmented synthetic resin compositions and products which include a pigmented resin composition. In particular the invention relates to antimony trioxide pigmented synthetic resins and paper or board products which include the antimony trioxide pigmented synthetic resin, particularly photographic support materials and composite photographic products.

It is known, for example from British patent specification No. 1,043,703, that photographic support materials can be produced by coating paper with polyolefins and treating the polyolefin surface with electrical discharge to achieve the necessary wet and dry adhesion of subsequently applied light sensitive emulsion layers.

The use of clear unpigmented polyolefins may result in poor photographic definition, and in order to improve the definition of support materials white pigmented polymers are often used. The improved definition occurs owing to the opacifying effect of the pigmented polyolefin layer and the reduced reflection from the base paper surface. The whiteness of a photographic print depends primarily on the whiteness of the support material and can affect the aesthetic desirability and technical quality of the print.

It is already well known to use titanium dioxide as a white pigment in polyolefin resins which are used in the manufacture of photographic support materials. Titanium dioxide has an advantage over other pigments of having a high covering power, i.e. good opacity, when compounded with polyolefins. Opacity depends on the particle size and shape, crystal structure, refractive index of the pigment and the nature and refractive index of the polyolefin.

In order to produce a technically and commercially acceptable support material it has become a common practice to apply titanium dioxide pigmented polyolefin resins with 7-15% $TiO_2$ content at coating weights between 12 and 60 g.s.m. Other pigment loadings and coating weights are, however, not precluded.

The pigmented polyolefin is normally applied by means of extrusion coating although other methods can be used.

In order to achieve the variety of white shades which may be required according to the end of the photographic support material, tinting can be employed. For instance, different white tints can be produced by adding small quantities of highly coloured resin of so-called masterbatches to the normal titanium dioxide pigmented resins. Whilst the use of different colourants in masterbatch form enables a wide range of whites to be produced—and more pleasing whites, depending on taste—they do not lead to the production of bright whites in view of their decreased reflection of light. It is possible to achieve brighter whites by the use of clear polyolefin coatings on a bright white paper support. However, a non-pigmented film immediately underneath the light-sensitive emulsion leads to a loss of definition in the image produced on exposure. The image clarity can be improved by using a low polyolefin coating weight, i.e. 12 g.s.m., and pre-coating of baryta on the base paper. The baryta coating permits the manufacture of a wide range of white shades and a satisfactory product but it is not as good for definition as when pigmented polyolefin is employed.

In order to improve the brightness of photographic support materials and yet retain good photographic definition, it has been found that the brightness of pigmented coatings can be improved by the use of optical brightening agents (hereinafter referred to as O.B.A.'s). O.B.A.'s improve brightness and whiteness by absorbing ultraviolet energy and re-emitting this as visible light at a higher wavelength in the visible spectrum. Unfortunately however, titanium dioxide also absorbs ultraviolet light which is not re-emitted. The consequence, therefore, of adding O.B.A.'s to titanium dioxide pigmented resins is a marked reduction in the efficiency of the O.B.A.'s.

It has now been discovered that the use of antimony trioxide as a partial or complete replacement for titanium dioxide as a white pigment in pigmented coatings overcomes this difficulty. Further, if the O.B.A. is omitted from a coating then antimony trioxide still gives a brighter product than a titanium dioxide pigment without a brightening agent would in a similar coating.

It will also be appreciated that the concept of obtaining a high degree of brightness and whiteness in polyolefin compositions as described above is applicable not only to compositions which are intended for use in coating applications but also to polyolefin and other resin compositions generally, for example compositions for moulding containers and other articles of manufacture. Accordingly the present invention provides a synthetic resin composition comprising at least one white pigment the white pigment or pigments consisting of or comprising antimony trioxide in an amount of 1 to 80% by weight of the synthetic resin and an optical brightening agent in an amount of up to 0.5% by weight of the synthetic resin and the pigment. Although a range of amount of 1 to 80% by weight of antimony trioxide can be used in the synthetic resin composition of this invention the preferred amount is from 10-40% by weight of the synthetic resin.

Also included in the scope of the invention is an article of manufacture which includes or comprises a synthetic resin containing at least one white pigment, the white pigment or pigments consisting of or comprising antimony trioxide and an optical brightening agent. The preferred amount of O.B.A. is between 0.05 and 0.25% by weight of the synthetic resin and pigment.

Further, the invention relates to photographic support materials comprising the synthetic resin composition as described above having adhered thereto a photographic emulsion, and optionally an optical brightening agent.

In particular the present invention provides a paper and board product coated with the synthetic resin composition which contains at least one white pigment and an optical brightening agent, the white pigment or pigments consisting of or comprising antimony trioxide. As the invention has particular application to photographic support materials and it is accordingly to be understood that the scope of the invention also extends to composite photographic products comprising a synthetic resin coated paper or board as described above having adhered thereto a photographic emulsion.

A synthetic resin coated paper and board as used herein includes in particular a preformed film which is laminated to the paper or board, extrusion coated paper and board products as well as alternative coating techniques.

The thermoplastic resins that can be used in this invention to coat the paper or board include polystyrenes, polyvinyl and polyvinylidene compounds, polyamides, polyacrylates, polyesters, polycarbonates and cellulose esters. The preferred thermoplastic resin is a polyolefin.

Antimony trioxide does not absorb ultraviolet energy as does titanium dioxide and therefore ultraviolet energy, as for instance in sunlight falling onto a coating containing antimony trioxide and an O.B.A., is converted into visible light. The support therefore appears brighter owing to the increased reflection of visible light. Comparative experiments with antimony trioxide loaded and titanium dioxide loaded polyolefin compositions have been carried out and the antimony trioxide pigmented compositions have shown substantial improvements in brightness compared with the titanium dioxide, pigmented compositions. This difference in brightness is increased when an O.B.A. is used. This is shown in the following examples.

Mixture A, a blend of:         EEL fluorescence, percent
   89.8% low density polyethylene _____
   10.0% antimony trioxide _____ } 66.5
   0.2% Uvitex OB _____

Mixture B, a blend of:
   89.8% low density polyethylene _____
   10.0% titanium dioxide _____ } 19.75
   0.2% Uvitex OB _____

Uvitex OB (trademark) is an O.B.A. capable of withstanding the high temperatures (e.g. 315° C.) experienced in extrusion coating.

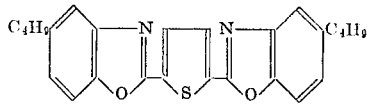

The stated percentages of the components of the mixture are percentages by weight. The EEL fluorescence results, as quoted above, were obtained on an "EEL" fluorescence light meter produced by Evans Electroselenium of Harlow, Essex.

If, for some reason, it is desirable to omit an optical brightening agent from a coating, then antimony trioxide still gives a brighter product than titanium dioxide without a brightening agent.

Examples of the O.B.A.'s which can be used in this invention are:

| Optical brightening agent | Supplier |
| --- | --- |
| Photine E.B. conc. powder. The chemical composition is a 2-(m-chlorostyryl) naphth (1:2d) oxazole | Hickson & Welch Ltd. |

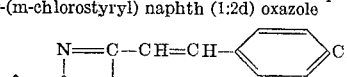

| | |
| --- | --- |
| Fluolite XMP, a substituted triazine compound | I.C.I. |
| Blancophor KUM, a phenyl coumarin derivative | Bayer. |
| Tinopal (a mixture of 70 parts of CH3311 and 30 parts of CH3313). Tinopal, CH 3311 is a substituted 2,3′ stilbene naphthatriazole. Tinopol CH 3313 is a substituted phenylcoumarin. | Geigy. |

In the case of certain photographic papers it is desirable to tint the coating to give say a blue or pink white. The tinting of titanium dioxide loaded polymers is achieved by using dyestuffs or pigments. The same procedure can also be applied to antimony trioxide coatings with or without the presence of a brightening agent. Pigments and dyestuffs never increase reflectivity, e.g. a blue pigment in fact absorbs all wavelengths of light except blue. The net result of this is that when pigments and dyestuffs are added the overall reflectivity decreases except at a particular wavelength characteristic of the pigment. Because antimony trioxide gives an overall greater reflectivity than titanium dioxide it follows that tinted versions of antimony trioxide coatings will also be at a higher reflectivity than the titanium dioxide counterparts, assuming the same addition of dyestuff or pigment.

Additives other than optical brightening agents can be used in conjunction with antimony trioxide. Typical of the additives which might be used are: anti-oxidants, antiblock, slip, release and antistatic agents, coloured pigments and dyes. Other additives not mentioned are not precluded.

In the manufacture of colour prints it is desirable to protect the colour emulsions frrom attack by UV radiation and this is readily achieved by means of titanium dioxide in the polyolefin coating which absorbs the radiation. In the case of antimony trioxide in the polyolefin coating such protection is not afforded without the use of optical brightening agents. It is conceivable, however, that when antimony trioxide coated paper is used for the production of colour prints the colour emulsions can be doctored to prevent attack by ultra violet light. For the production of coated paper for use as colour prints antimony trioxide pigment can be used alone with the synthetic resin. It is advantageous however to use the antimony trioxide pigment with an optical brightening agent so that the light at the ultra violet end of the spectrum does not affect the colour emulsion.

The use of antimony trioxide as a pigment in the manufacture of photographic supports is not confined to use with low density polyethylene, as the preferred polyolefin other polyolefins such as medium and high density polyethylene and polypropylene can be easily pigmented to give bright coatings. Mixtures of antimony trioxide and other pigments, i.e. $TiO_2$, can also be used.

Whilst the preferred procedure for the manufacture of photographic supports is extrusion coating, this disclosure does not preclude other means of coating and does not confine the pigment concentration to 7–15%. For example, photographic support materials can be produced by dispersion coating with a polyethylene, O.B.A., antimony trioxide dispersion and other techniques such as the lamination of preformed film are possible. The $TiO_2$ pigment concentration is normally confined to about 7–15% by weight of the base polymer when extrusion coating due to adequate definition at the coating weights employed, i.e. 12–60 g.s.m., and the possibility of extrusion problems at higher pigment loadings when $TiO_2$ is used. However, where antimony trioxide loaded polyolefins are employed and alternative means of applying the pigmented polyolefin are used, the pigment concentration could vary from 1 to 80% by weight of the polymer. Similarly, whilst 0.2% O.B.A. has been used in experimental work as described above, improvements in brightness are not confined to this concentration.

Synthetic resin compositions of this invention can be used in other photographic applications. For example, a coloured pigment or dyestuff can be added to polyethylene containing antimony trioxide and an optical brightening agent. This composition is applied to the surface of a support of for example paper or board to form a non-light sensitive photographic support. The pigmented synthetic resin is then coated with silver precipitation nuclei, to form a product useful in diffusion transfer photographic systems.

The following examples illustrate the invention. The percentages of the components are by weight unless otherwise stated.

EXAMPLE 1

184 g.s.m. base paper was coated on the face side with 40 g.s.m. of a composition as follows:

| | Percent |
|---|---|
| Antimony trioxide | 18 |
| Uvitex OB | 0.10 |
| Low density polyethylene | 81.9 |

The wire side of the base paper was coated with 30 g.s.m. of high density polyethylene containing 0.10% Uvitex OB. After high frequency treatment of the face side and subcoating of the face and wire sides the paper was coated with colour emulsions.

EXAMPLE 2

110 g.s.m. base paper was coated on the face side with 24 g.s.m. of a composition as follows:

| | Percent |
|---|---|
| Antimony trioxide | 15 |
| Uvitex OB | 0.10 |
| Low density polyethylene | 84.9 |

The wire side was coated with 24 g.s.m. of high density polyethylene containing 0.1% Uvitex O.B.A. The paper was subsequently coated with a photographic emulsion and used for phototypesetting.

EXAMPLE 3

135 g.s.m. base paper was coated on the face side with 30 g.s.m. of the following composition:

| | Percent |
|---|---|
| Antimony trioxide | 18 |
| Uvitex OB | 0.1 |
| Low density polyethylene | 81.9 |

The wire side was coated with 30 g.s.m. of high density polyethylene containing 0.1% Uvitex OB. The paper, after high frequency treatment, was coated with a photographic emulsion for the production of black and white prints.

EXAMPLE 4

135 g.s.m. fluorescent dyed base paper was coated on the face side with:

| | Percent |
|---|---|
| Antimony trioxide | 15 |
| Fluolite XMP | 0.16 |
| Low density polyethylene | 84.84 |

The wire side was coated with 30 g.s.m. of high density polythene containing 0.1% Fluolite XMP. After HF treating the face side a photographic emulsion was applied.

EXAMPLE 5

184 g.s.m. base paper was coated on the face side with 40 g.s.m. of the following composition:

| | Percent |
|---|---|
| Antimony trioxide | 9.48 |
| Barium sulphate | 10 |
| Low density polyethylene | 80 |
| Fluolite XMP | 0.16 |

The wire side was coated with 30 g.s.m. of high density polyethylene and after subsequent HF treatment a photographic emulsion was applied.

EXAMPLE 6

184 g.s.m. base paper was coated on the face side with 40 g.s.m. of the following composition:

| | Percent |
|---|---|
| Antimony trioxide | 14.84 |
| Blue masterbatch | 5 |
| Low density polyethylene | 80 |
| Uvitex OB | 0.16 |

The blue masterbatch has the following composition:

| | Percent |
|---|---|
| Low density polyethylene | 98.96 |
| Reckitts Ultramarine Blue RS7 | 1.04 |

The wire side of the paper was coated with 30 g.s.m. high density polythene and after HF treatment a colour emulsion was applied.

The above description has been directed primarily towards the manufacture of photographic supports. However, it will be appreciated that where bright white polyolefin coatings are required in other applications such as coated paper or board for packaging the principles of the invention may be used. Consequently the scope of the invention extends to all polyolefin coated paper or board products when comprising pigmented polyolefin coatings as described herein.

We claim:
1. A photographic support material consisting essentially of:
   (a) a sheet of paper or board, having coated on at least one surface thereof
   (b) a synthetic resin composition consisting essentially of
      (i) synthetic resin selected from the group consisting of polyolefins, polystyrene, a polyvinyl compound, a polyvinylidene compound, a polyamide, a polyacrylate, a polyester, a polycarbonate and a cellulose ester;
      (ii) a white pigment, wherein the improvement comprises the use as a white pigment of
      (iii) antimony trioxide in an amount from 1 to 80% by weight of the synthetic resin;
      (iv) and an optical brightening agent in an amount of up to 0.5% by weight of synthetic resin and pigment.
2. A photographic support material as claimed in claim 1 wherein the synthetic resin is a low density polyethylene.
3. A photographic support material as claimed in claim 2 which additionally contains a coloured pigment or dyestuff.
4. A photographic support material as claimed in claim 3 which has silver precipitation nuclei coated thereon.

References Cited

UNITED STATES PATENTS

| 3,449,257 | 6/1969 | Tuite et al. | 96—82 X |
|---|---|---|---|
| 3,501,298 | 3/1970 | Crawford | 96—85 |

RONALD H. SMITH, Primary Examiner

U.S. Cl. X.R.

96—82, 85; 117—155; 252—301.3 W